United States Patent
Ding et al.

(10) Patent No.: US 12,262,353 B2
(45) Date of Patent: Mar. 25, 2025

(54) RESOURCE SELECTION METHOD AND DEVICE, TERMINAL, AND MEDIUM

(71) Applicant: GUANGDONG OPPO MOBILE TELECOMMUNICATIONS CORP., LTD., Dongguan (CN)

(72) Inventors: Yi Ding, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 368 days.

(21) Appl. No.: 17/871,199

(22) Filed: Jul. 22, 2022

(65) Prior Publication Data
US 2022/0361151 A1   Nov. 10, 2022

Related U.S. Application Data

(63) Continuation of application No. PCT/CN2020/074476, filed on Feb. 7, 2020.

(51) Int. Cl.
*H04W 72/02* (2009.01)
*H04W 28/26* (2009.01)
*H04W 72/0446* (2023.01)

(52) U.S. Cl.
CPC ........... *H04W 72/02* (2013.01); *H04W 28/26* (2013.01); *H04W 72/0446* (2013.01)

(58) Field of Classification Search
CPC . H04W 72/02; H04W 28/26; H04W 72/0446; H04W 72/566; H04W 92/18; H04W 4/40; H04W 72/20; Y02D 30/70
See application file for complete search history.

(56) References Cited

U.S. PATENT DOCUMENTS

2019/0208504 A1* 7/2019 Yasukawa ............. H04W 24/10
2022/0272709 A1* 8/2022 Jiang ..................... H04W 72/53

FOREIGN PATENT DOCUMENTS

CN       107484254 A    12/2017
CN       109247073 A     1/2019
(Continued)

OTHER PUBLICATIONS

3rd Generation Partnership Project; Technical Specification Group Radio Access Network; Overall description of Radio Access Network (RAN) aspects for Vehicle-to-everything (V2X) based on LTE and NR (Release 16) 3GPP TR 37.985 V1.0.0 (Nov. 2019) (Year: 2019).*

(Continued)

*Primary Examiner* — Shailendra Kumar
(74) *Attorney, Agent, or Firm* — BAYES PLLC (57) ABSTRACT

The present application relates to the field of wireless communications. Disclosed are a resource selection method and device, a terminal, and a medium. The method comprises: determining a resource monitoring window, wherein the resource monitoring window comprises some of time slots before a time slot m where a selected resource is located; and when the monitoring result of the resource monitoring window is that a resource conflict occurs between the selected resource and a reserved resource of a second terminal, performing resource reselection for the selected resource. In the present application, the determined resource monitoring window only comprises some of the time slots before the time slot m where the selected resource is located, instead of all the time slots, and therefore, in a monitoring process of resource reselection, the time required for monitoring is reduced, and the power consumption of a first terminal is reduced.

11 Claims, 6 Drawing Sheets

(56) References Cited

FOREIGN PATENT DOCUMENTS

| | | |
|---|---|---|
| CN | 109417777 A | 3/2019 |
| CN | 109565793 A | 4/2019 |
| CN | 109644436 A | 4/2019 |
| WO | 2017176097 A1 | 10/2017 |
| WO | 2017179286 A1 | 10/2017 |
| WO | 2018084575 A1 | 5/2018 |
| WO | 2018145067 A1 | 8/2018 |
| WO | 2019066629 A1 | 4/2019 |
| WO | 2019091143 A1 | 5/2019 |
| WO | 2019178749 A1 | 9/2019 |

OTHER PUBLICATIONS

Huawei, HiSilicon, Sidelink resource allocation mode 2 for NR V2X, 3GPP TSG RAN WG1 Meeting #99, Reno, USA, Nov. 18-22, 2019, R1-1911884 (Year: 2019).*
Intel Corporation, Summary#4 for AI 7.2.4.2.2 Mode-2 Resource Allocation, 3GPP TSG RAN WG1 Meeting #99, Reno, USA, Nov. 18-22, 2019, R1-1913569 (Year: 2019).*
Second Office Action issued in corresponding European application No. 20917893.8, mailed Nov. 30, 2023.
First Office Action issued in corresponding Japanese application No. 2022-545919, mailed Feb. 2, 2024.
First Office Action issued in corresponding European application No. 20917893.8, mailed Jul. 6, 2023.
First Office Action issued in corresponding Canadian application No. 3,166,472, mailed Sep. 20, 2023.
First Office Action issued in corresponding Chinese application No. 202211448612.8, mailed Apr. 24, 2024.
Priority Review issued in corresponding Chinese application No. 202211448612.8, mailed Apr. 25, 2024.
Third Office Action issued in corresponding European application No. 20917893.8, mailed May 22, 2024.
Second Office Action issued in corresponding Chinese application No. 202211448612.8, mailed Jul. 6, 2024.
International Search Report from the International Searching Authority Re. Application No. PCT/CN2020/074476, mailed Oct. 28, 2020, 6 pages.
Written Opinion of the International Searching Authority Re. Application No. PCT/CN2020/074476, mailed Oct. 28, 2020, 9 pages.
3GPP TS 36.213 V15.7.0 (Sep. 2019); Technical Specification Group Radio Access Network; Evolved Universal Terrestrial Radio Access (E-UTRA); Physical layer procedures (Release 15), 545 pages.
First Office Action issued in corresponding Indian application No. 202227041050, mailed Oct. 18, 2022.
Extended European Search Report issued in corresponding European application No. 20917893.8, mailed Nov. 11, 2022.
3GPP TR 37.985 V1.0.0 (Nov. 2019); 3rd Generation Partnership Project; Technical Specification Group Radio Access Network; Overall description of Radio Access Network (RAN) aspects for Vehicle-to-everything (V2X) based on LTE and NR (Release 16).
Huawei et al., "Sidelink resource allocation mode 2 for NR V2X", R1-1911884, 3GPP TSG RAN WG1 Meeting #99 Reno, USA, Nov. 18-22, 2019.
Intel Corporation, "Summary#4 for AI 7.2.4.2.2 Mode-2 Resource Allocation", R1-1913569, 3GPP TSG RAN WG1 Meeting #99 Reno, Nevada, USA, Nov. 18-22, 2019.
Notice of Reasons for Refusal issued in corresponding Japanese Application No. 2022-545919, mailed Aug. 2, 2024, 7 pages.
Result of Substantive Examination issued in corresponding Vietnamese Application No. 1-2022-05257, mailed Sep. 5, 2024, 4 pages.
Notice of Deficiencies issued in corresponding Israeli for Patent Application No. 294978, mailed on Sep. 18, 2024, 4 pages.
Notification to Grant Patent Right for Invention issued in corresponding Chinese Application No. 202211448612.8, mailed Oct. 18, 2024, 7 pages.

* cited by examiner

RESOURCE SELECTION METHOD AND DEVICE, TERMINAL, AND MEDIUM

CROSS-REFERENCE TO RELATED APPLICATION

This application is a continuation of International Application No. PCT/CN2020/074476, filed on Feb. 7, 2020, which is incorporated herein by reference in its entirety.

TECHNICAL FIELD

The present application relates to the field of wireless communication, and in particular, to a resource selection method and apparatus, a terminal and a medium.

BACKGROUND

In order to realize the direct communication between terminals in the Vehicle to Everything (V2X) system, the SideLink (SL) transmission mode is introduced.

In one transmission mode of SL, the terminal needs to perform resource selection in the resource pool. The terminal determines a resource selection window and a resource listening window, and according to the listening result of the resource listening window, excludes the resource(s) in the resource selection window, and obtains the candidate resource(s) (resources after the exclusion) of the service to be transmitted. The terminal randomly selects a resource from the candidate resource(s) to transmit the service to another terminal, including the initial transmission and retransmission of the service.

SUMMARY

Embodiments of the present application provide a resource selection method and apparatus, a terminal, and a medium. The technical solutions are as follows.

According to an aspect of the present application, a resource selection method is provided, which is applied to a first terminal, and the method includes:

determining a resource listening window, where the resource listening window includes a part of slots before a slot m where a selected resource is located; and when a listening result of the resource listening window is that a resource conflict occurs between the selected resource and a reserved resource of a second terminal, performing resource reselection on the selected resource.

According to an aspect of the present application, a resource selection apparatus is provided, which is applied to a first terminal, and the apparatus includes:

a determining module, configured to determine a resource listening window, where the resource listening window includes a part of slots before a slot m where a selected resource is located; and a reselection module, configured to perform resource reselection on the selected resource when a resource listening result of the resource listening window is that a resource conflict occurs between the selected resource and a reserved resource of a second terminal.

According to an aspect of the present application, an apparatus of a resource selection method is provided, the apparatus including:

a determining module, configured to determine a resource listening window, where the resource listening window includes a part of slots before a slot m where a selected resource is located; and a reselection module, configured to perform resource reselection on the selected resource when a resource listening result of the resource listening window is that a resource conflict occurs between the selected resource and a reserved resource of a second terminal.

According to an aspect of the present application, a terminal is provided, the terminal including: a processor; a transceiver connected to the processor; a memory for storing executable instructions of the processor; wherein the processor is configured to load and execute the executable instructions to implement the resource selection method as described in the above aspects.

According to an aspect of the present application, a computer-readable storage medium is provided, executable instructions are stored in the readable storage medium, and the executable instructions are loaded and executed by a processor to implement the resource selection method as described in the above aspects.

The technical solutions provided by the embodiments of the present application include at least the following beneficial effects.

The resource listening window determined by the terminal only includes a part of the slots before the slot m where the selected resource is located, rather than all the slots. Therefore, in the listening process of resource reselection, the time required for listening is reduced, power consumption of the terminal is saved, and the battery life of the terminal is improved.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

DETAILED DESCRIPTION

In order to make the objectives, technical solutions and advantages of the present application clearer, the embodiments of the present application will be further described in detail below with reference to the accompanying drawings.

First, the terms involved in the embodiments of the present application are briefly introduced:

Vehicle to everything (V2X): It is the key technology of the future intelligent transportation system. It mainly studies the vehicle data transmission scheme based on the 3GPP communication protocol. V2X communication includes Vehicle to Vehicle (V2V) communication, Vehicle to Infrastructure (V2I) communication, and Vehicle to People (V2P) communication. V2X applications will improve driving safety, reduce congestion and vehicle energy consumption, improve traffic efficiency, etc.

Figure 1:
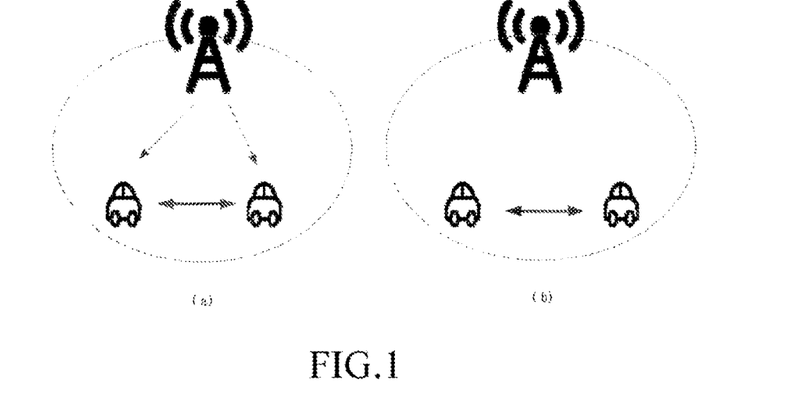
FIG. 1 is a schematic diagram of a transmission mode of a sidelink in the related art of the present application.

Side Link (SL) transmission: It is a device-to-device communication method with high spectral efficiency and low transmission delay. Two transmission modes of the sidelink are defined in 3GPP: Mode A and Mode B. As shown in (a) of FIG. 1, in mode A, the transmission resource of the terminal is allocated by the base station through the downlink, and the terminal transmits data on the sidelink according to the resource allocated by the base station; the base station may allocate the resource for a single transmission to the terminal, and may allocate the resource for semi-static transmission to the terminal. As shown in (b) of FIG. 1, in mode B, the terminal selects a resource in the resource pool to transmit data by itself. Specifically, the terminal may select a transmission resource from the resource pool by means of listening, or select a transmission resource from the resource pool by means of random selection.

In mode B of the transmission mode of the sidelink, the terminal may select the transmission resource from the resource pool by means of listening. Hereinafter, the resource selection methods in LTE-V2X and NR-V2X are described:

1) Resource Selection Method in LTE-V2X

When a new data packet arrives (that is, a service arrives) at time n, resource selection needs to be performed. The terminal may select a resource within [n+T1, n+T2] milliseconds according to the listening result in the past 1 second. Among them, T1<=4; 20<=T2<=100, and the selection of T1 should be greater than a processing delay of the terminal, and the selection of T2 should be within a range of service delay requirement. For example, if the service delay requirement is 50 ms, then 20<=T2<=50, and if the service delay requirement is 100 ms, then 20<=T2<=100.

Figure 2:
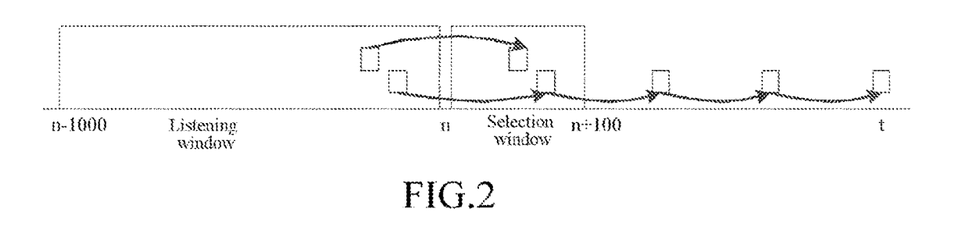
FIG. 2 is a schematic diagram of selecting a resource in LTE-V2X in the related art of the present application.

Exemplarily, as shown in FIG. 2, a new data packet arrives at time n, resource selection needs to be performed, and the resource listening window is [n−1000, n]. The service delay requirement is 100 ms, and the resource selection window is [n+4, n+100].

The process for the terminal to select a resource in the resource selection window is as follows (for the specific resource selection process, please refer to the operation steps in 3GPP TS36.213, and several main resource selection steps are listed here).

The terminal takes all available resources in the resource selection window as a set A, and the terminal performs an operation of excluding the resource(s) in the set A.

In step 1: if the terminal sends data in some subframes in the resource listening window and does not perform listening, the resources on subframes corresponding to these subframes in the resource selection window are excluded.

In step 2: if the terminal detects a Physical Sidelink Control Channel (PSCCH) within the resource listening window, it measures a Reference Signal Received Power (RSRP) of a Physical Sidelink Shared Channel (PSSCH) scheduled by the PSCCH, if the measured PSSCH-RSRP is higher than a PSSCH-RSRP threshold, and according to reservation information in the control information transmitted in the PSCCH, it is determined that the transmission resource reserved by another terminal is within the resource selection window of the terminal, the terminal excludes this resource from the set A. The selection of the PSSCH-RSRP threshold is determined by priority information carried in the detected PSCCH and a priority of the data to be transmitted by the terminal.

In step 3: if the number of resources remaining in set A is less than 20% of the total number of resources, the terminal increases the PSSCH-RSRP threshold by 3 dB, and repeats steps 1 to 2 until the number of remaining resources in set A is greater than 20% of the total number of resources.

In step 4: the terminal performs Sidelink Received Signal Strength Indicator (S-RSSI) detection on the remaining resources in the set A, sorts the remaining resources in the set A according to the energy level, and puts 20% resources with the lowest energy (relative to the number of resources in set A) into set B.

In step 5: the terminal selects one resource from set B with equal probability for data transmission.

2) Resource Selection Method by Listening in NR-V2X

In NR-V2X, autonomous driving needs to be supported, so a relatively high requirement is put forward for data interaction between vehicles, such as a higher throughput, a lower latency, a higher reliability, a larger coverage, a more flexible resource allocation, etc.

Figure 3:
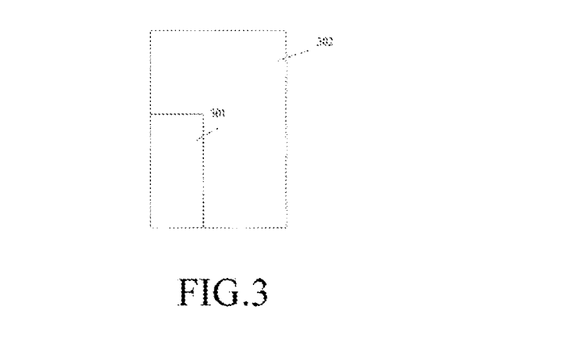
FIG. 3 is a block diagram of a physical layer structure of NR-V2X in the related art of the present application.

The physical layer structure of NR-V2X is shown in FIG. 3. PSCCH 301 used for transmitting control information is included in PSSCH 302 used for transmitting data, which also means that the PSCCH 301 and the PSSCH 302 should be sent at the same time.

The current standard only supports that the initial transmission of the current data block (Transport Block, TB) reserves the retransmission of the current TB, the retransmission of the current TB reserves the retransmission of the current TB, and the initial transmission (or retransmission) of the previous TB reserves the initial transmission (or retransmission) of the current TB.

Figure 4:
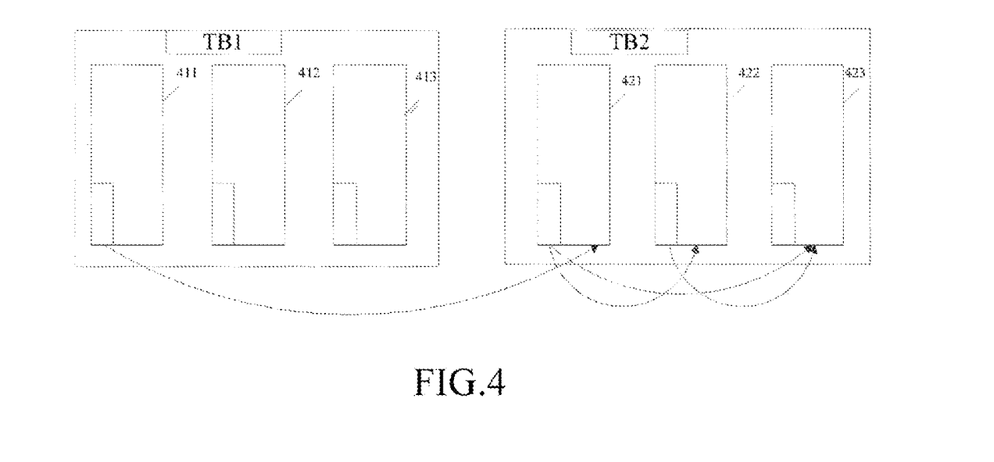
FIG. 4 is a schematic diagram of the transmission of TB in the related art of the present application.

As shown in FIG. 4, it is assumed that the current TB is TB2, and the previous TB is TB1. The initial transmission 421 of TB2 reserves the retransmission 422 and 423 of TB2, the retransmission 422 of TB2 reserves the retransmission 423 of TB2, the initial transmission 411 of TB1 reserves the initial transmission 421 of TB2, the retransmission 412 of TB1 reserves the retransmission 422 of TB2, and the retransmission 413 of TB1 reserves the retransmission 423 of TB2.

In NR-V2X, in the above mode B, the terminal also needs to select the resource by itself. The resource selection mechanism thereof is similar to the resource selection mechanism in the above-mentioned LTE-V2X.

When the terminal generates a service data packet at time n, it needs to select the resource, and it takes all the resources in the resource selection window as set A. The resource selection window starts at n+T1 and ends at n+T2. T1>=the time for the terminal to prepare to send data and select the resource, T2min<=T2<=the delay requirement range of the service. The value of T2min is $\{1, 5, 10, 20\}*2^{\mu}$ slots, where $\mu$=0, 1, 2, 3 corresponds to the subcarrier spacings of 15, 30, 60, and 120 kHz.

Figure 5:
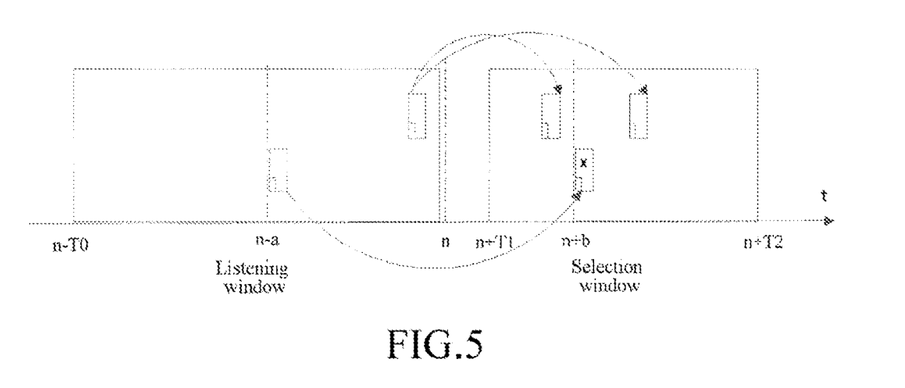
FIG. 5 is a schematic diagram of a resource selection method in the related art of the present application.

As shown in FIG. 5, the terminal performs resource listening at time n−T0 to n, and the value range of T0 is [100, 1100] milliseconds. If the terminal detects the PSCCH, it measures the RSRP of the PSCCH or the RSRP of the PSSCH scheduled by the PSCCH, and if the measured RSRP is greater than the RSRP threshold, and it is determined that the reserved resource is within the resource selection window according to the resource reservation information in the control information transmitted in the PSCCH, the corresponding resource is excluded from the set A.

After the resource exclusion is performed, the terminal randomly selects several resources from the set A as sending resources for its initial transmission and retransmission. The above RSRP threshold is determined by the priority carried in the PSCCH monitored by the terminal and the priority of the data to be sent by the terminal. In addition, a difference between the time domain position of the initial transmission resource selected by the terminal and the time domain position of the last retransmission resource needs to be less than or equal to W. In NR-V2X, W is equal to 32 slots. The length of each slot is related to the subcarrier spacing. If the subcarrier spacing is 15 kHz, the slot length is 1 msec, and if the subcarrier spacing is 30 kHz, the slot length is 0.5 msec.

It should be noted that resource preemption is supported in NR-V2X, that is, after the terminal performs resource exclusion, set A may include the resource block(s) reserved by a terminal with a low priority, and the terminal preempts the resource block(s) reserved by the terminal with a low priority. For example, resource preemption may be achieved by adjusting the RSRP threshold.

Assuming that in FIG. 5, terminal 1 generates data at time n for resource selection, terminal 1 determines a resource selection window from n+T1 to n+T2 and a resource listening window from n−T0 to n. Within the resource listening window, terminal 1 detects that terminal 2 sends PSCCH and PSSCH at time n−a and reserves resource x at time n+b. After detecting the PSCCH sent by terminal 2, terminal 1 knows that the priority carried in the PSCCH of terminal 2 is lower than the priority of the data to be sent by itself, thereby increasing the RSRP threshold, so that the probability that the measured RSRP of the signal sent by terminal 2 is lower than the RSRP threshold increases. When the measured RSRP is lower than the RSRP threshold, terminal 1 will not exclude the resource x reserved by the terminal 2. If terminal 1 randomly selects resource x reserved by terminal 2 in set A after resource exclusion, terminal 1 preempts resource x. On the contrary, if terminal 1 detects that the priority carried in the PSCCH of terminal 2 is higher than the priority of the data to be sent by itself, it reduces the RSRP threshold, so that the resource reserved by terminal 2 is easier to be excluded, thereby avoiding using the same resource block with the terminal with high priority.

In addition, NR-V2X supports continuous listening (re-evaluation) after initial selection of resources.

Figure 6:
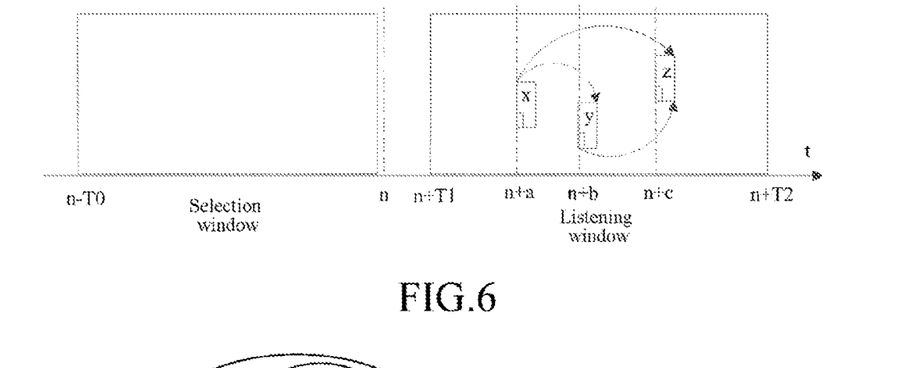
FIG. 6 is a schematic diagram of a resource selection method in the related art of the present application.

As shown in FIG. 6, the terminal generates data at time n, determines a resource listening window and a resource selection window of the resource for resource selection, and the terminal selects the initial transmission resource x at time n+a, and the retransmission resources y and z at time n+b and n+c. After time n, the terminal still continues to listen to the PSCCH. Before time n+a, if the terminal finds that resource x or resource y or resource z is reserved by other terminal (that is, a resource conflict occurs) through re-evaluation, and the measured RSRP is higher than the RSRP threshold, the terminal will release the corresponding resource, and on the premise of meeting the service delay requirement, the terminal reselects another resource. After time n+a, because the terminal has sent PSCCH and PSSCH on resource x and reserved resources y and z, only when the terminal finds that the UE with high priority has preempted resource y or z through re-evaluation, and RSRP is higher than the RSRP threshold, the terminal will release resource y or z and reselect the resource.

According to the above content, in the NR system, the UE is supported to perform resource reselection after selecting the resource. However, the UE continues to perform resource listening after selecting the resource, which may increase the energy consumption of the UE. To this end, the present application proposes a technical solution of partial listening (partial sensing) to save the energy consumption of the UE.

Figure 7:
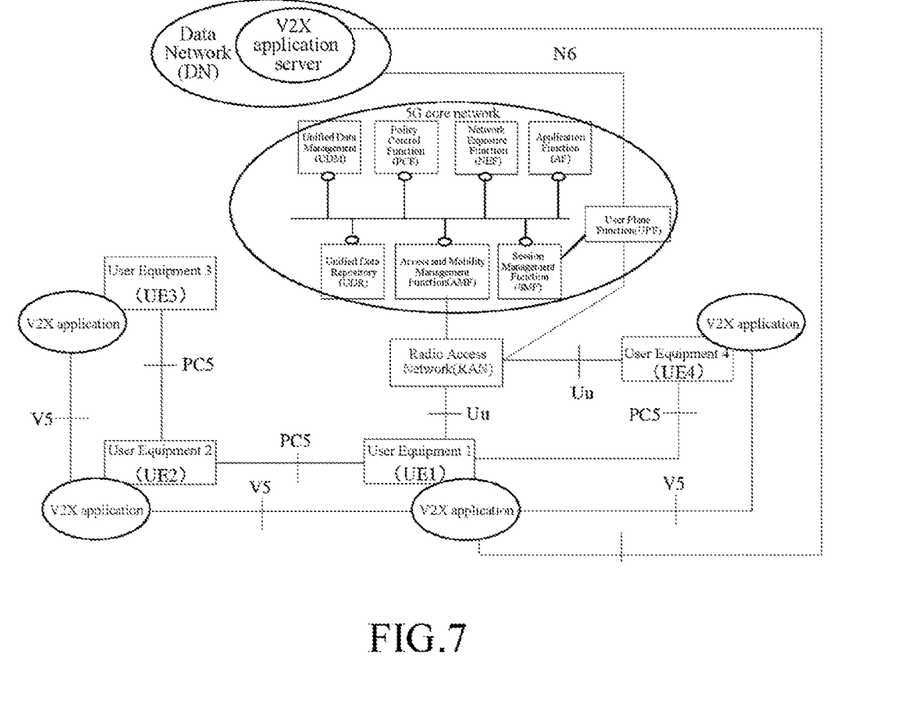
FIG. 7 is a block diagram of a communication system supporting sidelink transmission provided by an exemplary embodiment of the present application.

FIG. 7 shows a block diagram of a communication system supporting sidelink transmission provided by an exemplary embodiment of the present application. The communication system may be a schematic diagram of a Non-roaming 5G system architecture, and the system architecture may be applied to a Vehicle to everything (V2X) service using D2D technology.

The system architecture includes a Data Network (DN), and a V2X Application Server required for the V2X service is set in the data network. The system architecture also includes a 5G core network. The network functions of the 5G core network include: Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF).

The system architecture further includes: a radio access network (New Generation-Radio Access Network, NG-RAN) and four exemplary user equipments (i.e., user equipment 1 to user equipment 4), where each user equipment is provided with V2X application. One or more access network devices, such as base stations (gNBs), are provided in the radio access network. The user equipment performs uplink transmission to the access network device.

In the system architecture, the data network and the user plane function in the 5G core network are connected through N6 Reference Point, the V2X application server and the V2X application in the user equipment are connected through V1 reference point; the radio access network is connected to the AMF function and the UPF function in the 5G core network, and the radio access network is connected to the user equipment 1 and the user equipment 5 respectively through the Uu reference point; and multiple user equipments perform sidelink transmission through the PC5 reference point, and multiple V2X applications are connected through the V5 reference point. The above reference points may also be referred to as "interfaces".

Figure 8:
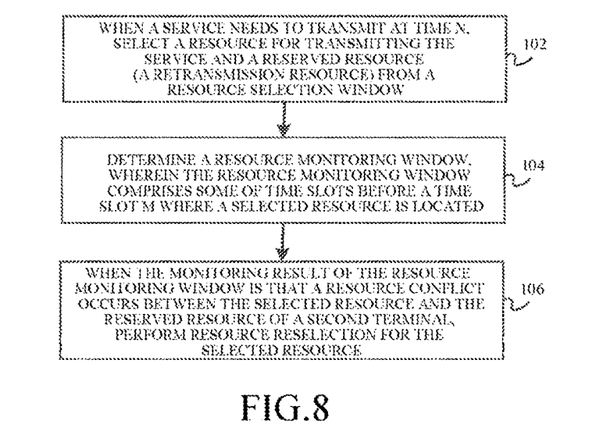
FIG. 8 is a schematic diagram of a resource selection method provided by an exemplary embodiment of the present application.

FIG. 8 shows a flowchart of a method for a resource selection method provided by an exemplary embodiment of the present application. The method may be executed by the user equipment in the V2X as shown in FIG. 7, and the user equipment is the first terminal for sending services during execution. The method includes the following steps.

In step 102, when a service arrives at time n, a resource for transmitting the service and a reserved resource (retransmission resource) are selected in a resource selection window.

The resource selection window is a window from time $n+T_{11}$ to time $n+T_{12}$, the first time period from time n to time $n+T_{11}$ is greater than or equal to a processing delay of the first terminal, and the second time period from time n to time $n+T_{12}$ is less than or equal to the delay requirement range of the service.

Optionally, there are multiple resources used to transmit services in the resource selection window, and the first terminal will only perform resource selection when the resource selection condition is met. For the method of resource selection, the foregoing introduction may be referred to. Exemplarily, the selected resource is located on the slot at time m.

In the Vehicle to everything system, the communication between two terminals is carried out by means of sidelink. Specifically, the two terminals adopt the mode B of the sidelink, that is, the first terminal selects one resource in a resource pool by itself to transmit data. At time n, the first terminal has a service to be transmitted, and the first terminal may perform resource selection in the resource selection window from time $n+T_{11}$ to time $n+T_{12}$, to select one initial transmission resource. The first terminal uses the initial transmission resource to transmit the service to the second terminal for the first time.

In step 104, a resource listening window is determined, and the resource listening window includes a part of slots before a slot m where the selected resource is located.

After determining the selected resource, the first terminal also needs to continuously monitor whether the selected resource conflicts with the reserved resource of other terminal(s). However, in order to reduce the listening duration, the first terminal determines the resource listening window. The resource listening window includes a part (but not all) of the slots between slot n and slot m. Among them, the slot n is the slot when the service arrives, and the slot m is the slot where the selected resource is located.

Optionally, there may be at least two selected resources, and each selected resource corresponds to its own located slot. For example, the selected resources include: initial transmission resource 1 and reserved retransmission resource 2. The slot where the initial transmission resource 1 is located is the slot m1, and the slot where the retransmission resource 2 is located is the slot m2, then the resource listening window 1 corresponding to the initial transmission resource 1 is determined according to a part of the slots before the slot m1, and the resource listening window 2 corresponding to the retransmission resource 2 is determined according to a part of the slots before the slot m2.

Optionally, if the last slot of the preliminarily determined resource listening window is located in the slot m−T3 or after the slot m−T3, the last slot of the resource listening window is modified to a slot m−T3−1, where T3 is the time required for the first terminal to perform resource reselection.

In step 106, when a listening result of the resource listening window is that there is a resource conflict between the selected resource and a reserved resource of a second terminal, resource reselection is performed on the selected resource.

The first terminal listens in the resource listening window, and when the listening result of the resource listening window is that the selected resource has a resource conflict with the reserved resource of the second terminal, a resource reselection is performed on the selected resource.

Possible sources of the above resource conflict include:
1. The selected resource is preempted by a second terminal with a higher priority;
2. After the first terminal selects the selected resource, a burst aperiodic service is generated in the second terminal and the selected resource is also reserved.

Taking the selected resource that has the conflict as the initial transmission resource (similar to the retransmission resource) as an example, the first terminal determines the reselection resource of the initial transmission resource in the reselection window.

Among them, the reselection window is a window from time $n+t_1+T_{21}$ to time $n+t_1+T_{22}$, and according to the listening result of the listened slot in the resource listening window determined in the previous step, the resource is excluded from the reselection window, and one resource is randomly selected from the remaining candidate resources as the reselection resource of the initial transmission resource.

Optionally, $T_{21}$ is greater than or equal to a processing delay of the terminal, and $t_1+T_{22}$ is less than or equal to a delay requirement range of the service. Time $n+t_1$ is the time when it is determined that the initial transmission resource conflicts.

Exemplarily, $t_1$ is 100 milliseconds, and the terminal determines that the initial transmission resource conflicts at n+100 milliseconds; the processing delay of the terminal is 10 milliseconds, and $T_{21}$ is equal to the processing delay of the first terminal, which is also 10 milliseconds; the delay requirement range of the service is 1000 milliseconds, $t_1+T_{22}$ is less than or equal to the delay requirement range of the service, and $T_{22}$ is 900 milliseconds. The reselection window is a window from time $n+t_1+10$ to time $n+t_1+900$.

To sum up, in the method provided in this embodiment, the resource listening window determined by the first terminal only includes a part of the slots before the slot m where the selected resource is located, but not all the slots. Therefore, during the listening process of resource reselection, the time required for listening is reduced, the power consumption of the first terminal is saved, and the battery life of the first terminal is improved.

Figure 9:
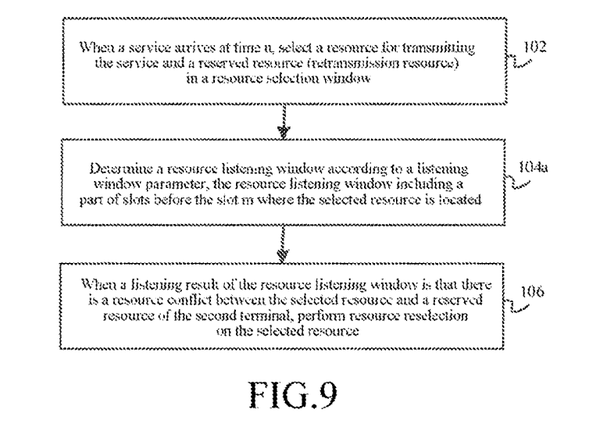
FIG. 9 is a schematic diagram of a resource selection method provided by an exemplary embodiment of the present application.

In an optional embodiment based on FIG. 8, step 104 may be implemented as the following steps, as shown in FIG. 9.

In step 104a: a resource listening window is determined according to a listening window parameter.

According to different types of the listening window parameter, this step of the first terminal includes at least the following four implementation manners.

In a first manner, the listening window parameter includes: a first parameter k.

The first terminal determines that the resource listening window includes: a part of slots in k slots before the slot m where the selected resource is located.

Exemplarily, the first terminal determines that the resource listening window includes: a resource listening window [m−k, m−T3), where T3 is the time required for the first terminal to perform resource reselection. That is, the resource listening window is from slot m−k to slot m−T3−1.

Figure 10:
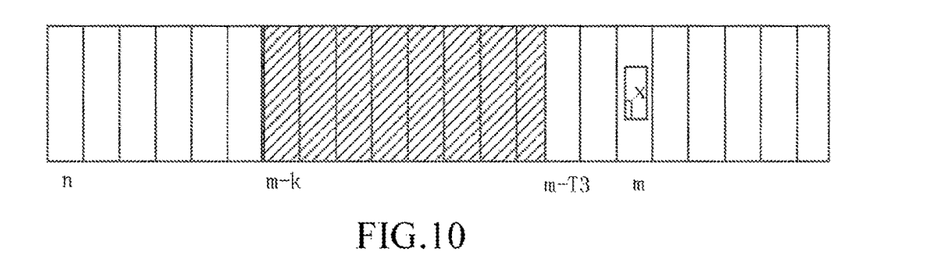
FIG. 10 is a time-frequency schematic diagram of a resource listening window provided by an exemplary embodiment of the present application.

As shown in FIG. 10, it is implemented by other device configuration or pre-configuration or UE. If the first terminal determines the first parameter k, the first terminal determines that the resource listening window is [m−k, m−T3), where T3 is the time required for the UE to perform resource reselection.

In a second manner, the listening window parameter includes: a bitmap and a time domain starting position of the bitmap.

The first terminal determines that the resource listening window includes: at least one slot before the slot m where the selected resource is located, at least one slot is specified in a time domain by the bitmap and the time domain starting position v of the bitmap, and the slot indicated by a bit with a first value in the bitmap is a slot in the resource listening window. The time domain starting position of the bitmap is v, optionally, v is equal to or greater than time n. The bitmap includes several bits. When the $i^{th}$ bit is 1, it means that the $(v+i)^{th}$ slot belongs to the resource listening window; when the $i^{th}$ bit is 0, it means that the $(v+i)^{th}$ slot does not belong to the resource listening window. Or, when the bit is 0, it represents that the $(v+i)^{th}$ slot belongs to the resource listening window; when the $i^{th}$ bit is 1, it represents that the $(v+i)^{th}$ slot does not belong to the resource listening window.

Figure 11:
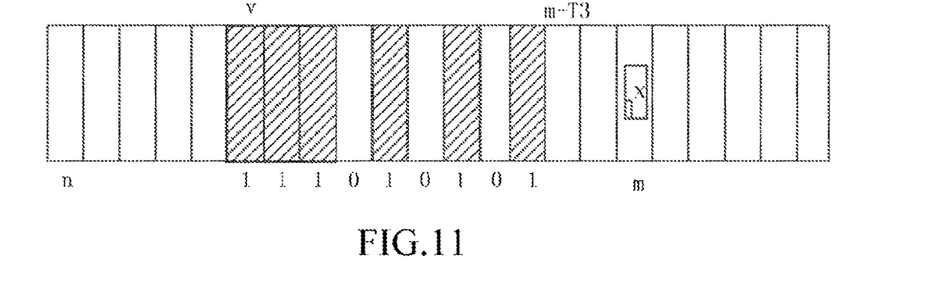
FIG. 11 is a time-frequency schematic diagram of a resource listening window provided by an exemplary embodiment of the present application.

As shown in FIG. 11, it is implemented through other device configuration or pre-configuration or UE. The first terminal determines the bitmap "111010101" and the time domain starting position v of the bitmap, then the first terminal determines that the resource listening window is a plurality of slots corresponding to the bits of 1.

Exemplarily, when the last slot indicated by the bitmap and the time domain starting position of the bitmap is located in the slot m−T3 or after the slot m−T3, the last slot of the resource listening window is modified to a slot m−T3−1; where T3 is the time when the first terminal performs resource selection.

In a third manner, the listening window parameter includes: a second parameter P1 and a third parameter P2.

The first terminal determines that the resource listening window includes: slot m−P1 to slot m−P2. P1 and P2 are integers.

Figure 12:
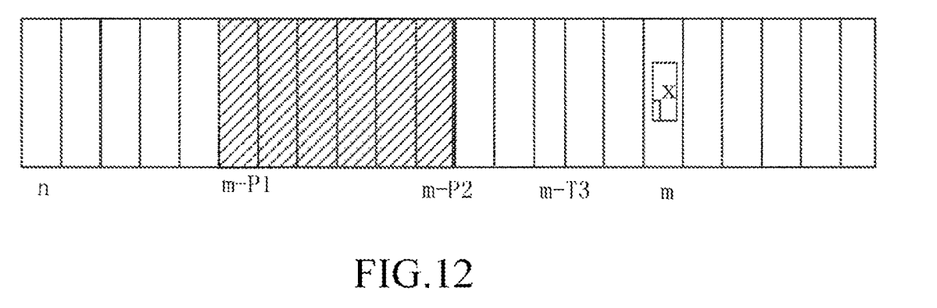
FIG. 12 is a time-frequency schematic diagram of a resource listening window provided by an exemplary embodiment of the present application.

As shown in FIG. 12, it is implemented through other device configuration or pre-configuration or UE. If the first terminal determines the second parameter P1 and the third parameter P2, the first terminal determines that the resource listening window is [m−P1, m−P2).

Exemplarily, when the slot m−P2 is later than or equal to the slot m−T3, the last slot of the resource listening window is revised to the slot m−T3−1; where T3 is the time for the first terminal to perform resource selection.

In a fourth manner, the listening window parameter includes: a fourth parameter u and a fifth parameter t.

The first terminal determines that the resource listening window includes: slot u to slot u+t, and slot u to slot u+t are located before slot m where the selected resource is located. u and t are integers.

Figure 13:
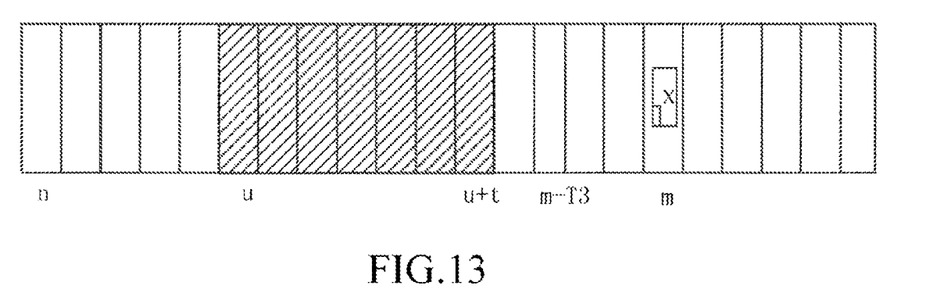
FIG. 13 is a time-frequency schematic diagram of a resource listening window provided by an exemplary embodiment of the present application.

As shown in FIG. 13, it is implemented through other device configuration or pre-configuration or UE. The first terminal determines the fourth parameter u and the fifth parameter t, and the first terminal determines that the resource listening window is [u, u+t).

Optionally, when the slot u+t is equal to the slot m−T3 or after the slot m−T3, the resource listening window is determined to include: slot u to slot m−T3−1; when slot u+t is before slot m−T3, it is determined that the resource listening window includes: slot u to slot u+t. The slot u to the slot u+t are located before the slot m where the selected resource is located, and T3 is the time when the first terminal selects the resource.

Figure 14:
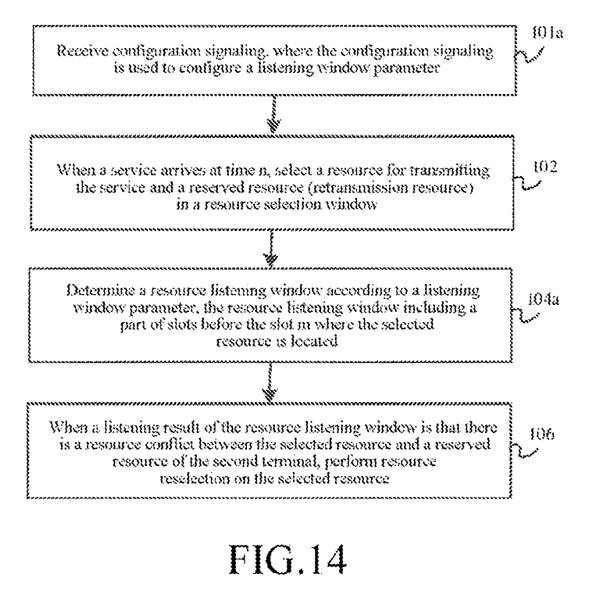
FIG. 14 is a schematic diagram of a resource selection method provided by an exemplary embodiment of the present application.

In an optional embodiment based on FIG. 8, as shown in FIG. 14, the above method further includes the following steps.

In step 101a: configuration signaling is received, where the configuration signaling is used to configure a listening window parameter.

The first terminal receives configuration signaling sent by other device. The configuration signaling is used to configure any one of the above four listening window parameters.

Figure 15:
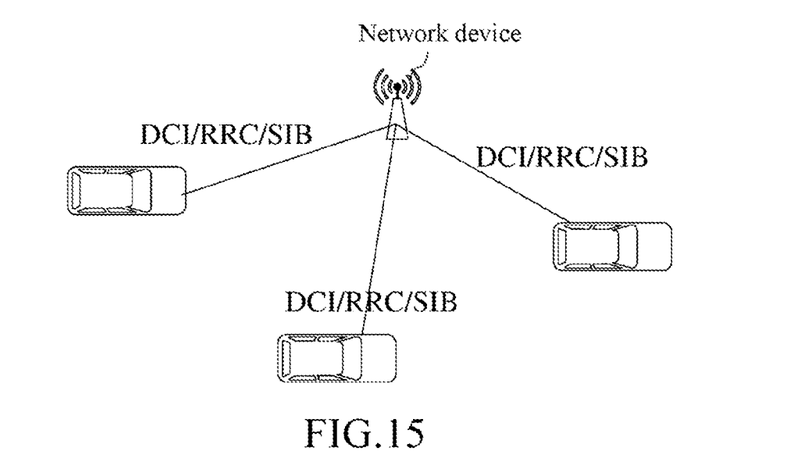
FIG. 15 is a schematic diagram of configuring by a network device provided by an exemplary embodiment of the present application.

In an example, the other device is a network device (or referred to as a network-side device, an access network device), and the network device sends a first configuration signaling to the first terminal. The first terminal receives the first configuration signaling sent by the network device. The first configuration signaling includes: Downlink Control Information (DCI); or, Radio Resource Control (RRC) signaling; or, a System Information Block (SIB) message, as shown in FIG. 15.

Taking the network equipment as an evolved base station (eNB) or a 5G base station (gNB) as an example, DCI is the control information transmitted by the eNB/gNB to the UE on the Physical Downlink Control Channel (PDCCH). RRC signaling is a method for the eNB/gNB to configure the UE when the UE is in the RRC connection state. The SIB message is the system information obtained when the UE initially accesses the network, and is generally sent periodically by the eNB/gNB. After the UE has accessed the network, it can still receive some SIB messages sent by the network.

Figure 16:
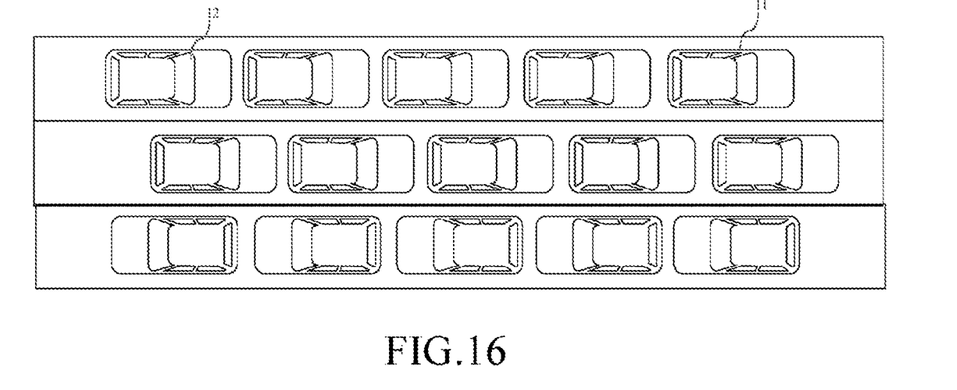
FIG. 16 is a schematic diagram of a vehicle grouping provided by an exemplary embodiment of the present application.

In another example, shown in FIG. 16, vehicle grouping is one of the newly introduced scenarios in NR-V2X. That is, several vehicles form a fleet and travel at the same speed. In the vehicle grouping scenario, a head vehicle 11 at the front of the group or a tail vehicle 12 at the end of the group often plays the role of group head, and performs work related to configuration, resource selection, and resource allocation for the vehicles in the group. In other scenarios of NR-V2X, there are similar situations where several vehicles form a group. In addition, 2 stage sidelink control information (2 stage SCI) is also introduced in NR V2X. In an exemplary 2 stage SCI, first sidelink control information storing resource-sensing related information is transmitted in PSCCH, and second sidelink control information storing remaining information is transmitted in PSSCH.

Figure 17:
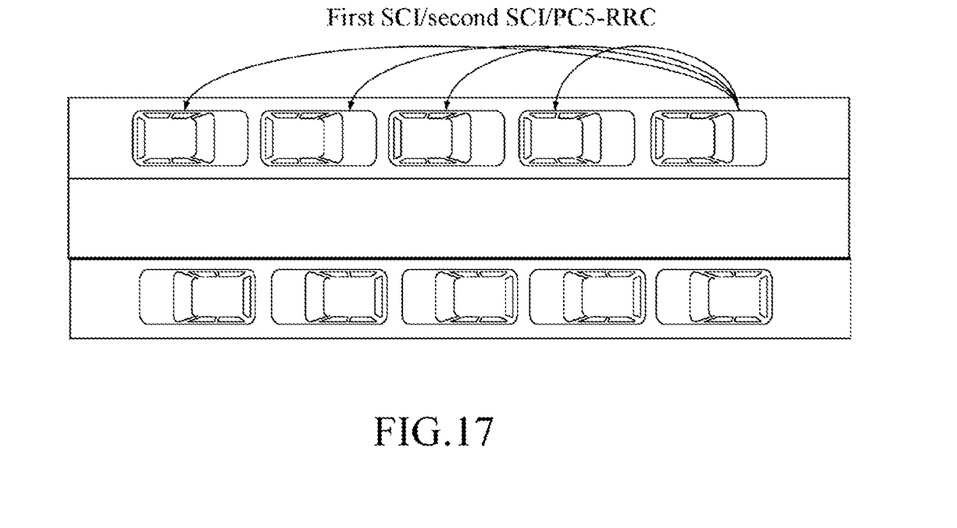
FIG. 17 is a schematic diagram of configuring by a third terminal serving as a group head provided by an exemplary embodiment of the present application.

Taking the first terminal serving as the terminal in the group and the third terminal serving as the group head terminal as an example, the third terminal serving as the group head sends second configuration signaling to the first terminal, and the first terminal receives the second configuration signaling sent by the third terminal serving as the group head. The second configuration signaling includes: first sidelink control information; or, second sidelink control information; or, PC5-RRC signaling; where the first sidelink control information is sidelink control information transmitted on PSCCH, the second sidelink control information is sidelink control information transmitted on the PSSCH, as shown in FIG. 17.

In an optional embodiment based on FIG. 14, the configuration signaling is used to configure the first terminal independently, or the configuration signaling is used to configure multiple terminals using the same resource pool. Specifically, the configuration signaling is used to configure the listening window parameter to the first terminal; or, the configuration signaling is used to configure the listening window parameter to multiple terminals using the same resource pool.

As an embodiment in parallel with FIG. 14, the terminal may also receive pre-configuration information, and the pre-configuration information is used to configure the listening window parameter. The pre-configuration refers to the situation that some configurations are pre-written when the terminal leaves the factory. The pre-configuration may also mean that the UE receives configuration information from a network device within a coverage area, and when the UE moves out of the coverage area, the previous configuration information is still used.

Figure 18:
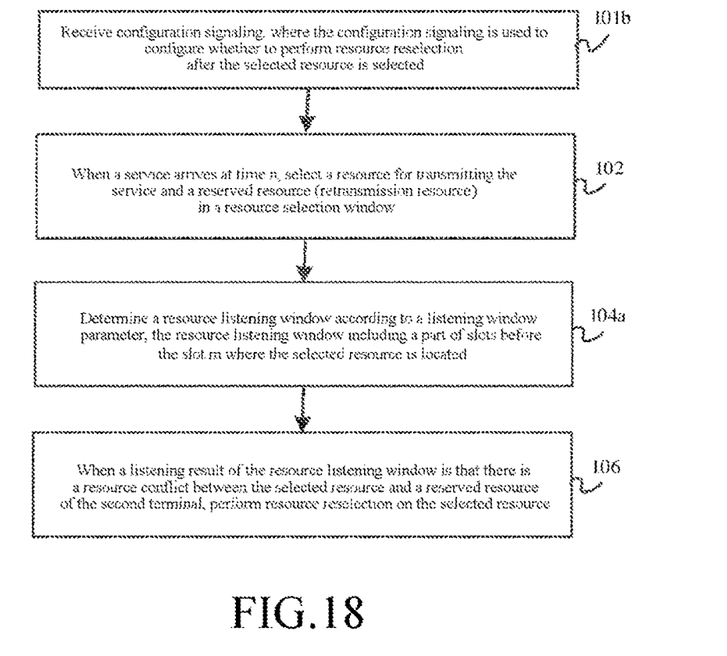
FIG. 18 is a schematic diagram of a resource selection method provided by an exemplary embodiment of the present application.

In an optional embodiment based on FIG. 8, as shown in FIG. 18, the above method further includes the following steps.

In step 101b, configuration signaling is received, where the configuration signaling is used to configure whether to perform resource reselection after the selected resource is selected.

The first terminal receives configuration signaling sent by other device. The configuration signaling is used to configure whether to perform resource reselection after the selected resource is selected.

In an example, the other device is a network device (or referred to as a network-side device, an access network device), and the network device sends the first configuration signaling to the first terminal. The first terminal receives the first configuration signaling sent by the network device, where the first configuration signaling includes: DCI; or, RRC signaling; or, a SIB message.

In another example, taking the first terminal as the terminal in the group and the third terminal as the group head terminal as an example, the third terminal as the group head sends the second configuration signaling to the first terminal, and the first terminal receives the second configuration signaling sent by the third terminal as the group head. The second configuration signaling includes: first sidelink control information; or second sidelink control information; or PC5-RRC signaling, where the first sidelink control information is sidelink control information transmitted on the PSCCH, and the second sidelink control information is sidelink control information transmitted on the PSSCH.

In an optional embodiment based on FIG. 18, the configuration signaling is used to configure the first terminal independently, or the configuration signaling is used to configure multiple terminals using the same resource pool. Specifically, the configuration signaling is used to configure to the first terminal whether to perform resource reselection after selecting the selected resource; or, the configuration signaling is used to configure to multiple terminals using the same resource pool whether to perform resource reselection after selecting the selected resource. The multiple terminals include the first terminal.

As an embodiment in parallel with FIG. 18, the terminal may also receive pre-configuration information, and the pre-configuration information is used to configure whether to perform resource reselection after the selected resource is selected.

It should be noted that, when the configuration scenario is "resource reselection is required after the selected resource is selected", the "configuration signaling" shown in FIG. 14 and FIG. 18 may be the same signaling, that is, the configuration signaling is not only used to configure resource reselection after the selected resource is selected, but also used to configure the listening window parameter. However, in some other embodiments, the "configuration signaling" in FIG. 14 and FIG. 18 may be two different signaling.

Another point that needs to be explained is that the above-mentioned listening window parameters and whether to perform resource reselection for the selected resource may also be realized by the internal code of the first terminal without the need for configuration by other device.

Another point that needs to be explained is that the terminal may decide by itself whether to perform a resource reselection operation after selecting a resource and determine relevant parameters by itself. For example, the terminal may decide whether to perform resource reselection according to the remaining power of the terminal or the measured Channel Busy Ratio (CBR). The resource reselection operation is performed when the remaining power of the terminal is relatively high or the measured CBR is relatively high. Otherwise, the resource reselection operation is not performed. The "resource reselection operation" here refers to determining the resource listening window for listening, and according to the listening result of the resource listening window, when a resource conflict occurs between the selected resource and the reserved resource of the second terminal, the resource reselection is performed on the selected resource. If the resource reselection operation is not performed, it is neither necessary to determine the resource listening window nor to listen.

Figure 19:
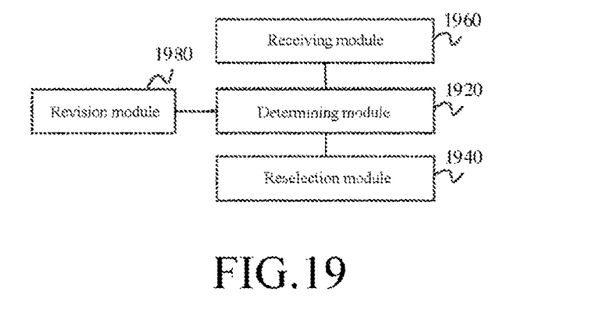
FIG. 19 is a structural block diagram of a resource selection apparatus provided by an exemplary embodiment of the present application.

FIG. 19 shows a block diagram of a resource selection apparatus shown in an exemplary embodiment of the present application. The apparatus is applied in a first terminal, or the apparatus is implemented as a first terminal, and the apparatus includes:

a determining module 1920, configured to determine a resource listening window, where the resource listening window includes a part of slots before a slot m where a selected resource is located;

a reselection module 1940, configured to perform resource reselection on the selected resource when the listening result of the resource listening window is that the selected resource has a resource conflict with a reserved resource of the second terminal.

In an optional embodiment, the determining module 1920 is configured to determine the resource listening window according to a listening window parameter.

In an optional embodiment, the listening window parameters include: a first parameter k;

the determining module 1920 is configured to determine that the resource listening window includes: a part of k slots before the slot m where the selected resource is located.

In an optional embodiment, the listening window parameter includes: a bitmap and a time domain starting position of the bitmap;

the determining module 1920 is configured to determine that the resource listening window includes: at least one slot before slot m where the selected resource is located, and the at least one slot is specified in a time domain by the bitmap and the time domain starting position of the bitmap, and a slot indicated by a bit with a first value in the bitmap is the slot in the resource listening window.

In an optional embodiment, the listening window parameter includes: a second parameter P1 and a third parameter P2;

the determining module 1920 is configured to determine that the resource listening window includes: slot m−P1 to slot m−P2.

In an optional embodiment, the listening window parameter includes: a fourth parameter u and a fifth parameter t;

the determining module 1920 is configured to determine that the resource listening window includes: slot u to slot u+t, where the slot u to slot u+t are located before the slot m where the selected resource is located.

In an optional embodiment, the apparatus further includes: a revision module 1980, configured to, when the last slot of the resource listening window determined by the determining module 1920 is in the slot m−T3 or after the slot m−T3, revise the last slot of the resource listening window to slot m−T3−1;

where T3 is time when the first terminal performs resource selection.

The receiving module 1960 is configured to receive configuration signaling, where the configuration signaling is used to configure the listening window parameter.

In an optional embodiment, the receiving module 1960 is configured to receive first configuration signaling sent by a network device, where the first configuration signaling includes: downlink control information (DCI); or, radio resource control (RRC) signaling; or, a System Information Block (SIB) message.

In an optional embodiment, the receiving module 1960 is configured to receive second configuration signaling sent by a third terminal serving as a group head, where the second configuration signaling includes: first sidelink control information; or, second sidelink control information; or, PC5-RRC signaling;

where the first sidelink control information is sidelink control information transmitted on a PSCCH, and the second sidelink control information is sidelink control information transmitted on a PSSCH.

In an optional embodiment, the configuration signaling is used to configure the listening window parameter to the first terminal; or, the configuration signaling is used to configure the listening window parameter to multiple terminals using the same resource pool, and the multiple terminals include the first terminal.

In an optional embodiment, the apparatus further includes: a receiving module 1960, configured to receive pre-configuration information, where the pre-configuration information is used to configure the listening window parameter.

In an optional embodiment, the apparatus further includes: a receiving module 1960, configured to receive configuration signaling, where the configuration signaling is used to configure whether to perform the resource reselection after the selected resource is selected.

In an optional embodiment, the receiving module 1960 is configured to receive first configuration signaling sent by a network device, where the first configuration signaling includes: downlink control information (DCI); or, radio resource control (RRC) signaling; or, a System Information Block (SIB) message.

In an optional embodiment, the receiving module 1960 is configured to receive second configuration signaling sent by a third terminal serving as a group head, where the second configuration signaling includes: first sidelink control information; or, second sidelink control information; or, PC5-RRC signaling;

where the first sidelink control information is sidelink control information transmitted on the PSCCH, and the second sidelink control information is sidelink control information transmitted on the PSSCH.

In an optional embodiment, the configuration signaling is used to configure to the first terminal whether to perform the resource reselection after the selected resource is selected; or, the configuration signaling is used to configure to multiple terminals using the same resource pool whether to perform the resource reselection after selecting the selected resource, the multiple terminals including the first terminal.

In an optional embodiment, the apparatus further includes: a receiving module 1960, configured to receive pre-configuration information, where the pre-configuration information is used to configure whether the first terminal performs the resource reselection after selecting the selected resource.

Figure 20:
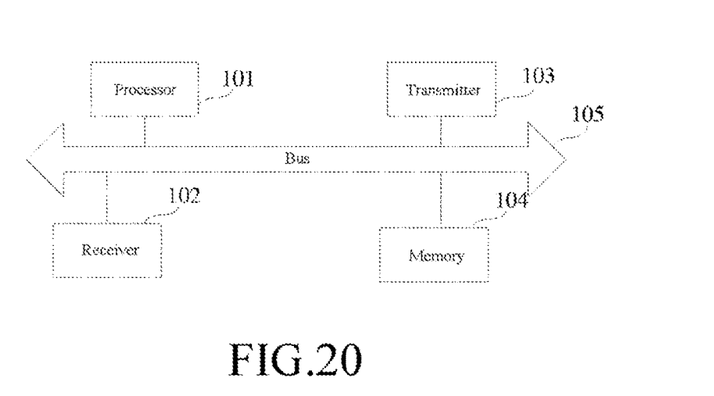
FIG. 20 is a schematic structural diagram of a terminal provided by an exemplary embodiment of the present application.

FIG. 20 shows a schematic structural diagram of a terminal provided by an exemplary embodiment of the present application. The terminal includes: a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as one communication component, which may be one communication chip.

The memory 104 is connected to the processor 101 through the bus 105.

The memory 104 may be configured to store at least one instruction, and the processor 101 is configured to execute the at least one instruction, so as to implement various steps in the foregoing method embodiments.

Additionally, the memory 104 may be implemented by any type or combination of volatile or non-volatile storage devices including, but not limited to, a magnetic or optical disk, an Erasable Programmable Read Only Memory (EEPROM), an Erasable Programmable Read Only Memory (EPROM), a Static Random Access Memory (SRAM), a Read-Only Memory (ROM), a magnetic memory, a flash memory, a Programmable Read-Only Memory (PROM).

In an exemplary embodiment, a computer-readable storage medium is also provided. The computer-readable storage medium stores at least one instruction, at least one piece of program, code set or instruction set, the at least one instruction, the at least one piece of program, the code set or the instruction set is loaded and executed by the processor to implement the resource selection method executed by the terminal provided by each of the above method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above descriptions are only optional embodiments of the present application, and are not intended to limit the present application. Any modifications, equivalent replacements, improvements, etc. made within the spirit and principles of the present application shall be included in the protection scope of the present application.

What is claimed is:

1. A resource selection method, applied to a first terminal, the method comprising:
   determining a resource listening window, wherein the resource listening window comprises a part of slots before a slot m where a selected resource is located; and
   when a listening result of the resource listening window is that a resource conflict occurs between the selected resource and a reserved resource of a second terminal, performing resource reselection on the selected resource,
   wherein the method further comprises:
   receiving pre-configuration information sent by a network device, wherein the pre-configuration information is used for configuring whether the first terminal performs the resource reselection after selecting the selected resource,
   wherein the determining the resource listening window comprises:
   determining the resource listening window according to a listening window parameter,
   wherein the listening window parameter comprises: a bitmap and a time domain starting position of the bitmap; and the determining the resource listening window according to the listening window parameter comprises:
   determining that the resource listening window comprises: at least one slot before the slot m where the selected resource is located, the at least one slot is specified in a time domain by the bitmap and the time domain starting position of the bitmap, and a slot indicated by a bit with a first value in the bitmap is the slot in the resource listening window.

2. The method according to claim 1, wherein the resource conflict occurring between the selected resource and a reserved resource of a second terminal, comprises:
   the selected resource is preempted by the second terminal, a data priority of the second terminal is higher than that of the first terminal, and a Reference Signal Received Power (RSRP) measured by the first terminal is higher than a first threshold;
   and/or,
   the selected resource has been reserved by the second terminal, and the RSRP measured by the first terminal is higher than the first threshold.

3. The method according to claim 1, wherein the method further comprises:
   receiving configuration signaling, wherein the configuration signaling is used for configuring the listening window parameter.

4. The method according to claim 3, wherein the receiving the configuration signaling comprises:
   receiving first configuration signaling sent by a network device, wherein the first configuration signaling comprises: downlink control information (DCI); or, radio resource control (RRC) signaling; or, a system information block (SIB) message.

5. The method according to claim 3, wherein:
   the configuration signaling is used for configuring the listening window parameter for a plurality of terminals using a same resource pool, and the plurality of terminals comprises the first terminal.

6. The method according to claim 1,
   wherein the pre-configuration information is used for configuring the listening window parameter.

7. A resource selection apparatus, comprising:
   a processor;
   a transceiver connected to the processor; and
   a memory for storing executable instructions for the processor;
   wherein the processor is configured to load and execute the executable instructions to:
   determine a resource listening window, wherein the resource listening window comprises a part of slots before a slot m where a selected resource is located; and
   perform resource reselection on the selected resource when a listening result of the resource listening window is that a resource conflict occurs between the selected resource and a reserved resource of a second terminal,
   wherein the processor is further configured to:
   receive pre-configuration information sent by a network device, wherein the pre-configuration information is used for configuring whether the first terminal performs the resource reselection after selecting the selected resource,
   wherein the processor is further configured to determine the resource listening window according to a listening window parameter,
   wherein the listening window parameter comprises: a bitmap and a time domain starting position of the bitmap; and
   the processor is further configured to determine that the resource listening window comprises: at least one slot before the slot m where the selected resource is located, the at least one slot is specified in a time domain by the bitmap and the time domain starting position of the bitmap, and a slot indicated by a bit with a first value in the bitmap is the slot in the resource listening window.

8. The apparatus according to claim 7, wherein the resource conflict occurring between the selected resource and a reserved resource of a second terminal, comprises:
   the selected resource is preempted by the second terminal, a data priority of the second terminal is higher than that of the first terminal, and a Reference Signal Received Power (RSRP) measured by the first terminal is higher than a first threshold;
   and/or,
   the selected resource has been reserved by the second terminal, and the RSRP measured by the first terminal is higher than the first threshold.

9. The apparatus according to claim 7, wherein the processor is further configured to:
   receive configuration signaling, wherein the configuration signaling is used for configuring the listening window parameter.

10. The apparatus according to claim 9, wherein:
    the processor is further configured to receive first configuration signaling sent by a network device, wherein the first configuration signaling comprises: downlink control information (DCI); or, radio resource control (RRC) signaling; or, a system information block (SIB) message.

11. The apparatus according to claim 9, wherein:
    the configuration signaling is used for configuring the listening window parameter for a plurality of terminals using a same resource pool, and the plurality of terminals comprises the first terminal.

* * * * *